(12) United States Patent
Nieberlein et al.

(10) Patent No.: US 10,490,990 B2
(45) Date of Patent: Nov. 26, 2019

(54) APPARATUS FOR ELECTRICALLY CONNECTING AT LEAST ONE ELECTRICAL COMPONENT TO A FIRST AND SECOND BUSBAR

(71) Applicant: Siemens Aktiengesellschaft, München (DE)

(72) Inventors: Klaus Nieberlein, Nürnberg (DE); Ewgenij Ochs, Fürth (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 16/315,460

(22) PCT Filed: Jun. 27, 2017

(86) PCT No.: PCT/EP2017/065828
§ 371 (c)(1),
(2) Date: Jan. 4, 2019

(87) PCT Pub. No.: WO2018/007202
PCT Pub. Date: Jan. 11, 2018

(65) Prior Publication Data
US 2019/0237956 A1     Aug. 1, 2019

(30) Foreign Application Priority Data

Jul. 7, 2016  (EP) .................................. 16178299

(51) Int. Cl.
*H02G 5/00* (2006.01)
*H02M 7/00* (2006.01)
(Continued)

(52) U.S. Cl.
CPC ............... *H02G 5/02* (2013.01); *H01B 17/58* (2013.01); *H02G 5/005* (2013.01); *H02M 7/003* (2013.01)

(58) Field of Classification Search
CPC ......... H02M 7/003; H02G 5/005; H02G 5/02; H05K 2201/10272; H02B 1/20; H01B 17/58
See application file for complete search history.

(56) References Cited

U.S. PATENT DOCUMENTS 5,875,091 A * 2/1999 Rieken ............... H01R 13/6625
361/328
2010/0173509 A1 * 7/2010 Holbrook ................ B60R 25/00
439/208

(Continued)

FOREIGN PATENT DOCUMENTS

CN      101252259 A     8/2008
CN      101901638 A    12/2010
(Continued)

OTHER PUBLICATIONS

PCT International Search Report and Written Opinion of International Searching Authority dated Jul. 3, 2018 corresponding to PCT International Application No. PCT/EP2017/065828 filed Jun. 27, 2017.

*Primary Examiner* — James Wu
(74) *Attorney, Agent, or Firm* — Henry M. Feiereisen LLC

(57) ABSTRACT

Apparatus for electrically connecting an electrical component to first and second busbars of different potential to one another during operation includes an insulation arranged between the first and second busbars and having first and second openings. The first busbar has a first busbar opening, intended as a first electrical connection, and a second busbar opening. The second busbar has a third busbar opening, intended as a second electrical connection, and a fourth busbar opening. The first opening of the insulation, the first busbar opening and the fourth busbar opening overlap, and the second opening of the insulation, the third busbar (Continued)

openings and the second busbar openings overlap. The insulation has a first boundary which demarcates the first insulation opening and projects into the fourth busbar opening of the second busbar, and a second boundary which demarcates the second opening and projects into the second busbar opening of the first busbar.

24 Claims, 3 Drawing Sheets

(51) Int. Cl.
     *H02G 5/02*          (2006.01)
     *H01B 17/58*        (2006.01)

(56) References Cited

U.S. PATENT DOCUMENTS

| | | | |
|---|---|---|---|
| 2010/0302733 A1 | 12/2010 | Woody et al. | |
| 2011/0127061 A1* | 6/2011 | Gotou | H02M 7/003 174/68.2 |
| 2013/0105961 A1 | 5/2013 | Jones et al. | |
| 2017/0229379 A1* | 8/2017 | Hayase | H01L 21/4814 |

FOREIGN PATENT DOCUMENTS

| | | |
|---|---|---|
| CN | 103123919 A | 5/2013 |
| DE | 19717550 A1 | 10/1998 |
| EP | 1120895 A2 | 8/2001 |
| EP | 1311045 A1 | 5/2003 |

* cited by examiner

APPARATUS FOR ELECTRICALLY CONNECTING AT LEAST ONE ELECTRICAL COMPONENT TO A FIRST AND SECOND BUSBAR

CROSS-REFERENCES TO RELATED APPLICATIONS

This application is the U.S. National Stage of International Application No. PCT/EP2017/065828, filed Jun. 27, 2017, which designated the United States and has been published as International Publication No. WO 2018/007202 and which claims the priority of European Patent Application, Serial No. 16178299.0, filed Jul. 7, 2016, pursuant to 35 U.S.C. 119(a)-(d).

BACKGROUND OF THE INVENTION

The invention relates to an apparatus for electrically connecting at least one electrical component to a first and second busbar, which busbars have a different potential to one another during electrical operation. The invention further relates to a converter which comprises the apparatus.

In converters of relatively high output, for electrical energy transmission in a DC network, in general, busbars with a large cross-section and a large surface area are used which enable an electrical connection from electrical or electronic components to the DC supply network. For reasons of environmental conditions, however, tight limits are usually imposed on a generous spatial arrangement of the busbars and the electrical components. Busbars lying directly opposite one another with respectively different potentials, in DC systems a positive potential opposite a negative potential, are often arranged at a small separation from one another.

The smaller the separation between busbars with different potentials in operation is selected to be, the greater is the danger that, due to insufficiently dimensioned air gaps or leakage paths between the two busbars, a short-circuit occurs in the form of a flashover. The air gap in the electrical context generally denotes the shortest distance between two electrical conductors (busbars) of different potential and the leakage path in the electrical context usually denotes the shortest distance along the surface of a solid insulating means between two electrical conductors (busbars).

In known manner, such flashovers can be prevented by the introduction of an electrical insulation between the two busbars. The selection of the insulation medium and the dimensioning of this electrical insulation usually takes place on the basis of relevant norms and standards taking account of the type and size of the voltage occurring in operation, as well as the structural arrangement of the busbars arranged opposite one another. For busbars with a small spacing from one another, for example, electrically insulating films are used which electrically insulate the busbars from one another.

The electrical connection of an electrical component to two busbars arranged opposite one another can take place, for example, by means of two terminal studs which are part of the electrical component. These terminal studs require a connecting opening of the first busbar and a through opening of the opposite second busbar and a further connecting opening of the second busbar and a further through opening of the opposite first busbar. A first terminal stud of the electrical component can be fed through the second busbar and connected mechanically and electrically to the connecting opening of the first busbar, and a second terminal stud of the electrical component can be fed through the further through opening of the first busbar and connected mechanically and electrically to the further connecting opening of the second busbar.

In order to prevent a flashover between, for example, the first terminal stud connected to the connecting opening of the first busbar and the passage opening of the second busbar, the passage opening of the second busbar is often selected to be excessively large, in contrast to the connecting opening of the first busbar, so that the electrically insulating film can achieve a sufficient insulating effect.

In particular, the passage openings selected, as a precaution, to be large lessen the conductivity of the busbar at these sites by reducing the conductive material and, associated therewith, with a consequent increase in the electrical resistance in the busbars. Electrical losses on the busbars which can have negative effects, in particular, on the efficiency, the availability and/or the operating life of the busbars and of the electrical components connected to the busbars are intrinsic to the system under these conditions and can only be kept within acceptable economic and technical limits with generous or over-dimensioned design of the busbars, the electrical connections and possibly also the electrical components attached to the busbars.

SUMMARY OF THE INVENTION

It is an object of the invention to provide an apparatus for electrically connecting electrical components to busbars, which is configured in a particularly space-saving manner and nevertheless has improved protection against flashovers.

The invention is based upon the recognition that for electrical connections with different potentials on busbars designed to be particularly compact and space-saving and which transmit a large electrical power level during operation, air gaps and leakage paths must be taken into account in a particular manner during the design of these electrical connections in order to prevent flashovers and their destructive effect.

According to the invention, an apparatus having a first and a second busbar and an insulation means for electrically connecting at least one electrical component is proposed, the first and the second busbars having a different potential to one another during electrical operation, wherein the insulation means is arranged between the first and second busbar and has a first and a second insulation means opening, wherein the first busbar has a first busbar opening, provided as a first electrical contact, and a second busbar opening, wherein the second busbar has a third busbar opening, provided as a second electrical connection, and a fourth busbar opening, wherein the first insulation means opening, the first busbar opening and the fourth busbar opening overlap and wherein the second insulation means opening, the third busbar openings and the second busbar openings overlap.

The apparatus is characterized in that the insulation means has a first opening boundary of the first insulation means opening, which projects into the fourth busbar opening of the second busbar, and in that the insulation means has a second opening boundary of the second insulation means opening, which projects into the second busbar opening of the first busbar.

The insulation means is configured to insulate the first busbar electrically from the second busbar.

By means of the first busbar opening of the first busbar, provided as the first electrical connection, and the third busbar opening of the second busbar, provided as the second electrical connection, an electrical connection of the busbars to the at least one electrical component can take place by means of connection elements of the at least one electrical component.

The projection of the first opening boundary of the first insulation means opening of the insulation means into the fourth busbar opening of the second busbar and the projection of the second opening boundary of the second insulation means opening of the insulation means into the second busbar opening of the first busbar enables by design means an advantageous spacing reduction between the electrical connections of the busbars as compared with previous solutions.

By means of the projection of the respective opening boundaries into the busbars, leakage paths via the insulation means between the first busbar opening of the first busbar and the fourth busbar opening of the second busbar and via the insulation means between the third busbar opening of the second busbar and the second busbar opening of the first busbar are sufficiently dimensioned so that flashovers on these leakage paths between the busbar openings as described of the busbars are advantageously preventable.

Advantageous embodiments of the apparatus are disclosed in the dependent claims.

In a first advantageous embodiment of the inventive apparatus, the fourth busbar opening has a first edge on the first side of the second busbar facing away from the insulation means, wherein the first opening boundary extends at least to the height of the first edge and/or the second busbar opening has a second edge on the second side of the first busbar facing away from the insulation means, wherein the second opening boundary extends at least to the height of the second edge.

In a further advantageous embodiment of the inventive apparatus, the first opening boundary extends beyond the first edge and/or the second opening boundary extends beyond the second edge.

The extending of the opening boundaries of the insulation means as far as the first edge of the fourth busbar opening of the second busbar and/or as far as the second edge of the second busbar opening of the first busbar, in particular also the extending of the insulation means there beyond advantageously provides a better protection for the electrical connection of at least one electrical component to the busbars against flashovers. The separation of the electrical connections from one another can be further reduced.

The insulation means can further comprise one or more mechanical fastening, by means of which the inventive apparatus is mechanically fastenable to or in a converter, for instance.

If, however for design reasons, the reduction of the separation is not provided, the fourth busbar opening of the second busbar and/or the second busbar opening of the first busbar can be configured such that, in contrast to known solutions with larger air gaps or leakage paths across the insulation means, on the second and/or fourth busbar openings, more electrically conductive material is introduced into the respective busbars. By this means, a cross-sectional increase of the conductive material of the busbars round the second and fourth busbar openings is achieved, which reduces their electrical resistance and thus increases their electrical conductivity and reduces their electrical losses.

In a further advantageous embodiment of the inventive apparatus, the opening boundaries of the insulation means openings of the insulation means each have a bead.

These beads which are insertable into the opening boundaries of the insulation means openings, for example as open channels, improve an electrical insulation effect at the leakage paths of the insulation means between the first busbar opening of the first busbar and the fourth busbar opening of the second busbar just as between the second busbar opening of the first busbar and the third busbar opening of the second busbar, wherein air gaps formed, in each case, over the leakage paths can be significantly shortened as compared with previous solutions.

In a further advantageous embodiment of the inventive apparatus, the first insulation means opening is larger than the first busbar opening and the second insulation means opening is larger than the third busbar opening.

It is mostly terminal studs that are used as connection elements of electrical components for the electrical connection and typically also for a mechanical connection of the electrical components to the busbars, said terminal studs being guidable, for example, through the first busbar opening of the first busbar and the third busbar opening of the second busbar, wherein these busbar openings are often dimensioned with regard to their diameter according to the terminal studs.

If, for the fastening of the terminal studs to the electrical connections of the busbars as fastening means, for example, fastening nuts are provided, said fastening nuts typically have a larger size than the diameter of the terminal studs. If at least one of the fastening nuts is provided for fastening to one of the terminal studs such that it is to be guided through the first insulation means opening or the second insulation means opening, the respective insulation means openings of the insulation means are advantageously designed to be larger than the first busbar opening of the first busbar and/or the third busbar opening of the second busbar.

In a further advantageous embodiment of the inventive apparatus, the insulation means extends completely over its surfaces facing toward the busbars and the insulation means is formed as a single piece.

The insulation means formed as a single piece is suitable, in particular, for a relatively simple and rapid assembly with the busbars. Since it extends completely over its surfaces facing toward the busbars, an insulation effect over these surfaces with regard to preventing flashovers is particularly advantageous.

In a further advantageous embodiment of the inventive apparatus, arranged between the first busbar and the second busbar is an insulation space for electrical insulation of the two busbars, wherein the insulation means is configured as a separate insert element within the insulation space and wherein the insulation means is directly connected to a further insulation means within the insulation space.

The advantage of the separate insert element has its effect, in particular, when the insulation means is provided for exchanging, for example, in the context of servicing or maintenance measures. In this embodiment of the inventive apparatus, the insulation means bridges only a part of the insulation space, which advantageously simplifies a removal and replacement of the delimited insert element as an insulation means.

Also conceivable is an arrangement of a first separate insert element at the first insulation means opening and a second separate insert element at the second insulation means opening, wherein the first separate insert element and the second separate insert element are suitable for forming, by means of an electrically insulating connector, the separate insert element.

In a further advantageous embodiment of the inventive apparatus, the further insulation means is a single-layered or multiple-layered film.

Such films or film arrangements which are inserted for electrical insulation between the first and second busbars for existing solutions are now advantageously provided to form the insulation space between the busbars in combination with the separate insert element or the first and second separate insert part as a separate insert element.

In a further advantageous embodiment of the inventive apparatus, the electrical connections are provided to connect the busbars electrically to a capacitor as the electrical component and/or to a power semiconductor module as the electrical component.

In a further advantageous embodiment of the inventive apparatus, the first busbar opening has as the first electrical connection of the first busbar, a funnel-shaped impression and/or the third busbar opening has a funnel-shaped impression as the second electrical connection of the second busbar.

By means of funnel-shaped impressions, it is possible to respond in an advantageous manner to specific requirements of manufacturers of electrical components regarding design features of the electrical connection to the busbars. Thus, structural differences between connection elements (for example, terminal studs) of the electronic components can be compensated for at the electrical connections by means of the funnel-shaped impression.

In a further advantageous embodiment of the inventive apparatus, the third busbar opening is arranged in a connection plane with the first busbar opening.

The formation of this connection plane permits a technically more efficient use of the inventive apparatus, possibly also associated with cost advantages resulting therefrom, since in particular, electrical components with standardized or normed connection elements can be used for the electrical connection to the busbars and thus connection problems can be reduced by means of different types of connection elements for the electrical components.

In a further advantageous embodiment of the inventive apparatus, the funnel-shaped impression is formed in the direction of the insulation means and/or the further funnel-shaped impression is configured in the direction of the insulation means.

This embodiment also advantageously allows the equalization of structural differences between the connection elements (for example, terminal studs) of the electronic components.

For the achievement of the object, furthermore, a converter with an inventive apparatus is proposed, comprising a DC circuit with the first busbar and the second busbar, wherein during the operation of the converter, the first potential is applied to the first busbar and the second potential is applied to the second busbar, also comprising the at least one electrical component which is electrically connectable by means of the electrical connections to the first and second busbars.

In an advantageous embodiment of the converter, the at least one electrical component is a capacitor and/or a power semiconductor module.

The above-described properties, features and advantages of this invention and the manner in which these are achieved will now be described more clearly and explicitly with the following description of the exemplary embodiments, which are described in greater detail by reference to the drawings. In the drawings:

DETAILED DESCRIPTION OF PREFERRED EMBODIMENTS

Figure 1:
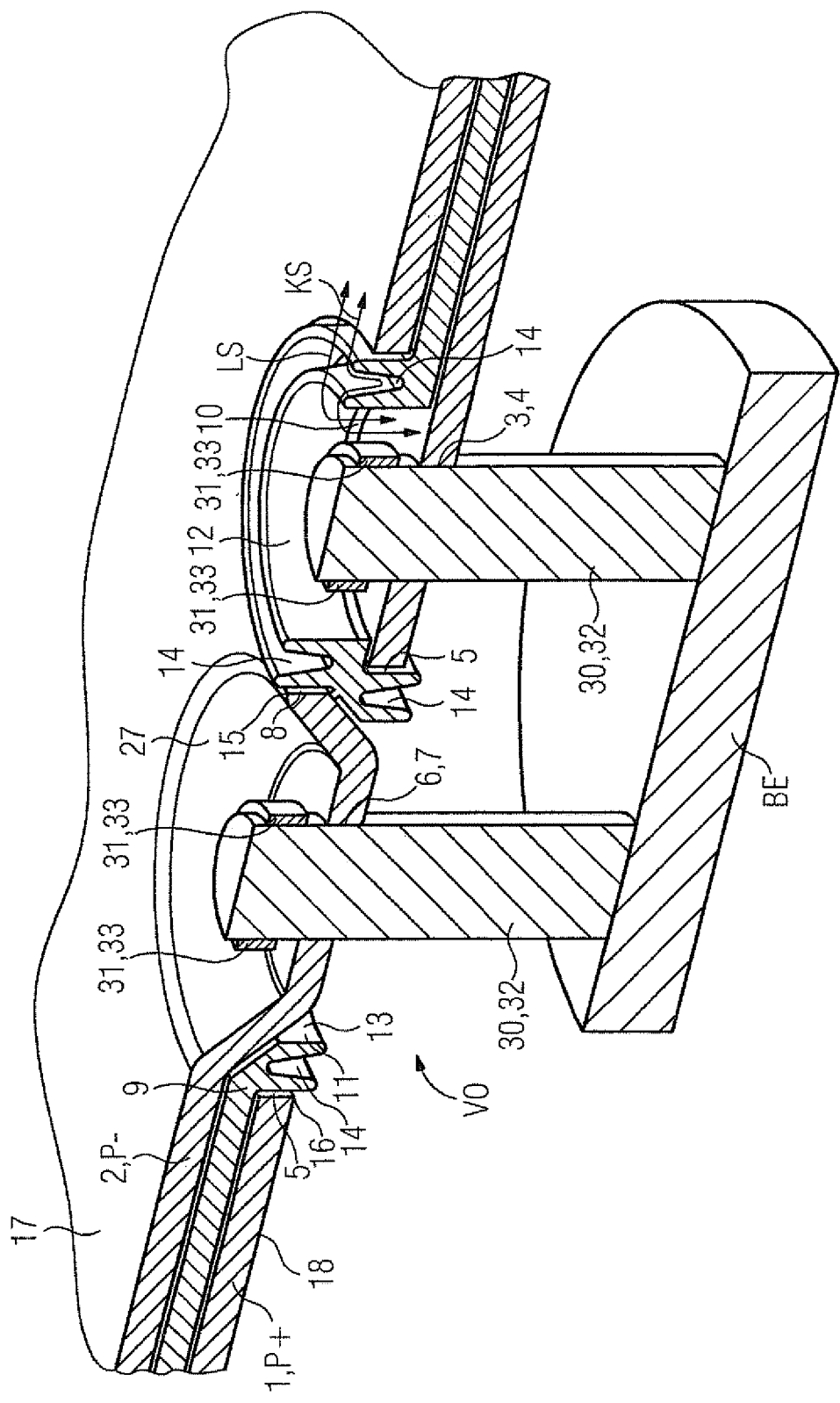
FIG. 1 is a first schematic representation of the inventive apparatus for electrically connecting at least one electrical component to a first and second busbar and an insulation means between the busbars.

FIG. 1 shows the apparatus VO according to the invention for electrically connecting at least one electrical component BE to a first and second busbar 1, 2. During electrical operation, the two busbars 1, 2 have a different potential P+, P− to one another. Arranged between the first and second busbar 1, 2 is an insulation means 9 which has a first and a second insulation means opening 10, 11. This insulation means 9 has the task of insulating the two busbars 1, 2 from one another electrically.

Arranged on the first busbar 1 is a first busbar opening 3, provided as a first electrical connection 4, and a second busbar opening 5. Arranged on the second busbar 2 is a third busbar opening 6, provided as a second electrical connection 7, and a fourth busbar opening 8. The first insulation means opening 10, the first busbar opening 3 and the fourth busbar opening 8 overlap just like the second insulation means opening 11, the third busbar openings 6 and the second busbar openings 5.

The insulation means 9 has a first opening boundary 12 of the first insulation means opening 10, which projects into the fourth busbar opening 8 of the second busbar 2. Furthermore, the insulation means 9 has a second opening boundary 13 of the second insulation means opening 11, which projects into the second busbar opening 5 of the first busbar 1.

The fourth busbar opening 8 has a first edge 15 on the first side 17 of the second busbar 2 facing away from the insulation means 9, wherein the first opening boundary 12 projects beyond the first edge 15. Furthermore, the second busbar opening 5 has a second edge 16 on the second side 18 of the first busbar 1 facing away from the insulation means 9, wherein the second opening boundary 13 extends beyond the second edge 16.

Beads 14 in the form of open channels are formed on both opening boundaries 12, 13 of the insulation means openings 10, 11 of the insulation means 9.

Indicated beyond the beads 14 of the insulation means 9 is a leakage path KS between the first busbar opening 3 of the first busbar 1 and the fourth busbar opening 8 of the second busbar 2. This leakage path KS of the insulation means 9 would have to overcome a flashover before damage can come about. As compared with the leakage path KS, the air gap LS is significantly shorter. This air gap LS must also be overcome in the event of a flashover.

In the example shown in FIG. 1, it is illustrated that the first insulation means opening 10 is larger than the first busbar opening 3 and the second insulation means opening 11 is larger than the third busbar opening 6.

The connection elements 30 are configured as terminal studs 32 of the electrical component BE for the electrical connection thereof to the busbars 1, 2. The connection elements 30 are guided through the first busbar opening 3 of the first busbar 1 and the third busbar opening 6 of the second busbar 2. In order to fasten the connection elements 30, that is the terminal studs 32, to the electrical connections 4, 7 of the busbars 1, 2, fastening elements 31 are provided which are configured in FIG. 1 as fastening nuts 33.

According to experience, such fastening nuts 33 for fastening the terminal studs 32 to the busbars 1, 2 are dimensioned larger in their diameter than the terminal studs 32. One of the fastening nuts 33 is guided through the first insulation means opening 10 of the insulation means 9. The first insulation means opening 10 is therefore configured larger than the first busbar opening 3 of the first busbar 1.

The insulation means 9 extends in FIG. 1 completely beyond its surfaces facing toward the busbars 1, 2. Furthermore, the insulation means 9 is configured as a single piece.

Figure 2:
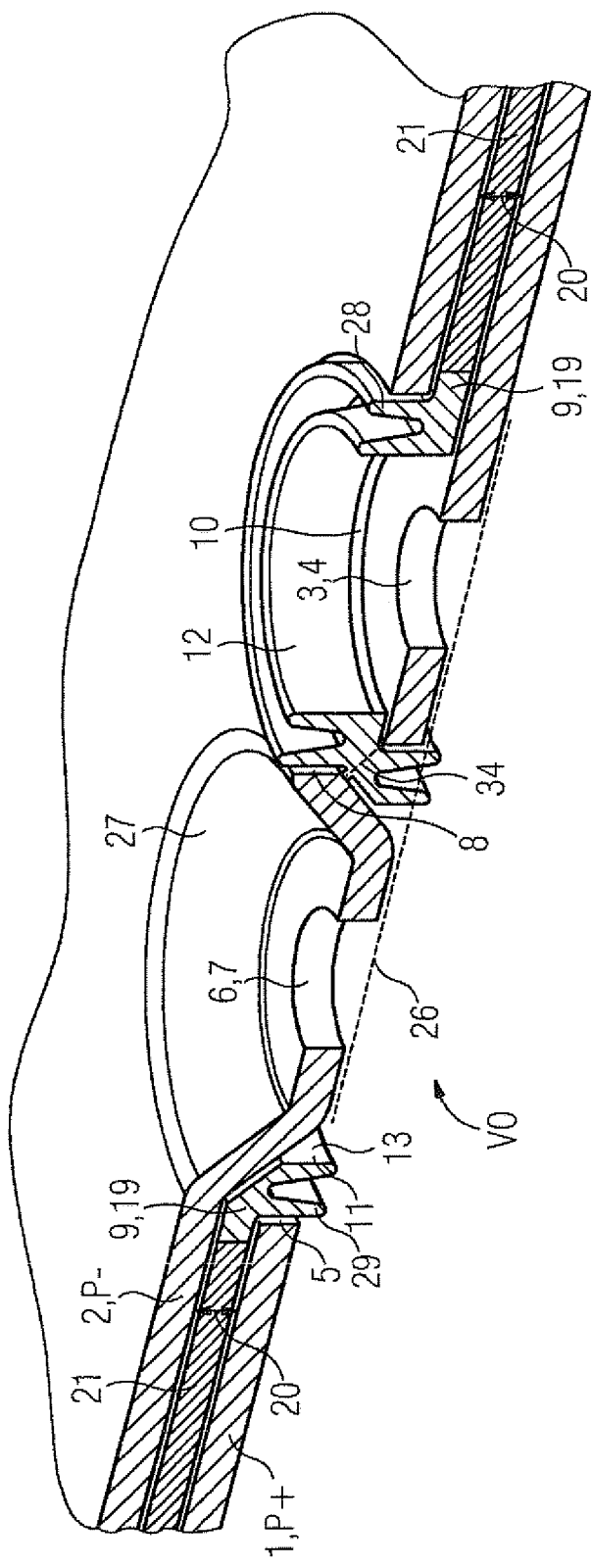
FIG. 2 is a second schematic representation of the apparatus according to FIG. 1 with a separate insert element as the insulation means.

FIG. 2 visualizes an example of the inventive apparatus VO on the basis of FIG. 1. Arranged between the first busbar 1 and the second busbar 2 is an insulation space 20 for electrical insulation of the two busbars 1, 2. Within the insulation space 20, the insulation means 9 is configured as a separate insert element 19. Furthermore, the insulation means 9 is directly connected to a further insulation means 21 within the insulation space 20.

The insulation means 9 in FIG. 2 occupies only a relatively small part of the insulation space 20, which makes a removal and reinsertion of the separate insert element 19 simpler than if the insulation means 9 is configured as a single piece as in FIG. 1.

A first separate insert element 28 at the first insulation means opening 10 can form, together with a second separate insert part 29 at the second insulation means opening 11, the separate insert element 19, wherein by means of an electrically insulating connector 34, both separate insert parts 28, 29 are mechanically connectable to the separate insert element 19.

The electrically insulating connector 34 is configured so that an electrically insulating effect is comparable with each of the separate insert parts 28, 29 or the separate insert element 19.

Both FIG. 1 and FIG. 2 show a funnel-shaped impression 27 at their third busbar opening 6 as a second electrical connection 7 of the second busbar 2. The funnel-shaped impression 27 is formed, in each case, in the direction of the insulation means 9. By means of the funnel-shaped impressions 27, for example, a structural difference between the two connection elements 30 (the two terminal studs 32) of the electronic component BE can be compensated for.

FIG. 2 also shows a connection plane 26 on which the first busbar opening 3 of the first busbar 1 and the third busbar opening 6 of the second busbar 2 are arranged together.

Figure 3:
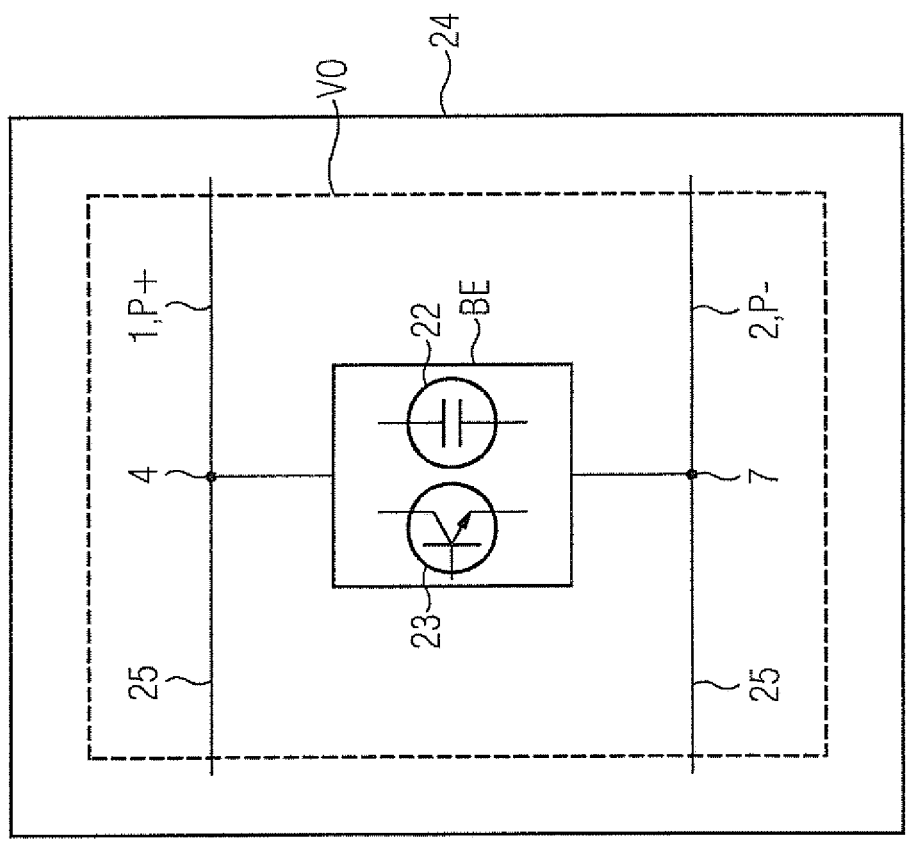
FIG. 3 is a schematic representation of a converter having the apparatus according to the invention of FIGS. 1 and 2.

In FIG. 3, a converter 24 with an inventive apparatus VO is shown, which is operated on a DC circuit 25 of the converter 24. During operation, a first potential P+ is applied on a first busbar 1 in the DC network 25 and a second potential P− is applied on a second busbar 2 of the DC network 25. At least one electrical component BE is electrically connected by means of electrical connections 4, 7 to the first and second busbars 1, 2.

The at least one electrical component BE electrically connected to the busbars 1, 2 is a capacitor 22 and/or a power semiconductor module 23.

What is claimed is:

1. Apparatus for electrically connecting to an electrical component, said apparatus comprising:
    first and second busbars having a different potential to one another during electrical operation, said first busbar having a first busbar opening to serve as a first electrical connection, and a second busbar opening, said second busbar having a third busbar opening to serve as a second electrical connection, and a fourth busbar opening; and
    an insulation arranged between the first and second busbars and having first and second openings, with the first opening of the insulation, the first busbar opening and the fourth busbar opening overlapping, and with the second insulation opening, the third busbar openings and the second busbar openings overlapping,
    said insulation having a first boundary which demarcates the first insulation opening and is configured to project into the fourth busbar opening of the second busbar, and a second boundary which demarcates the second insulation opening and is configured to project into the second busbar opening of the first busbar.

2. The apparatus of claim 1, wherein the fourth busbar opening has a first edge on a first side of the second busbar facing away from the insulation, said first opening boundary extending at least to a height of the first edge and/or wherein the second busbar opening has a second edge on a second side of the first busbar facing away from the insulation, said second opening boundary extending at least to a height of the second edge.

3. The apparatus of claim 2, wherein the first opening boundary extends beyond the first edge and/or wherein the second opening boundary extends beyond the second edge.

4. The apparatus of claim 1, wherein each of the first and second boundaries of the insulation has a bead.

5. The apparatus of claim 1, wherein the first insulation opening is sized larger than the first busbar opening, and the second insulation opening is sized larger than the third busbar opening.

6. The apparatus of claim 1, wherein the insulation has surfaces facing toward the first and second busbars and extending completely beyond the first and second busbars, said insulation being formed as a single piece.

7. The apparatus of claim 1, wherein the first and second busbars extend at a distance to one another to define an insulation space therebetween for electrical insulation of the first and second busbars, said insulation being configured as a separate insert element and disposed within the insulation space, and further comprising a further insulation directly connected to the insulation within the insulation space.

8. The apparatus of claim 7, wherein the further insulation is a single-layered or multi-layered film.

9. The apparatus of claim 1, wherein the first and second electrical connections are provided to connect the first and second busbars electrically to a capacitor as the electrical component and/or to a power semiconductor module as the electrical component.

10. The apparatus of claim 1, wherein the first busbar opening has a funnel-shaped impression and/or wherein the third busbar opening has a funnel-shaped impression.

11. The apparatus of claim 10, wherein the funnel-shaped impression of the first busbar opening and/or the funnel-shaped impression of the third busbar opening is/are formed in a direction of the insulation.

12. The apparatus of claim 1, wherein the third busbar opening is arranged in a connection plane with the first busbar opening.

13. A converter, comprising:
    an apparatus comprising first and second busbars, said first busbar having a first busbar opening to serve as a first electrical connection, and a second busbar opening, said second busbar having a third busbar opening to serve as a second electrical connection, and a fourth busbar opening, and an insulation arranged between the first and second busbars and having first and second openings, with the first opening of the insulation, the first busbar opening and the fourth busbar opening overlapping, and with the second insulation opening, the third busbar openings and the second busbar openings overlapping, said insulation having a first boundary which demarcates the first insulation opening and is configured to project into the fourth busbar opening of the second busbar, and a second boundary which demarcates the second insulation opening and is configured to project into the second busbar opening of the first busbar;

a DC circuit configured to include the first and second busbars such that during operation of the converter, a first potential is applied to the first busbar and a second potential, which is different from the first potential, is applied to the second busbar; and an electrical component electrically connectable via the first and second electrical connections to the first and second busbars.

14. The converter of claim 13, wherein the at least one electrical component is a capacitor and/or a power semiconductor module.

15. The converter of claim 13, wherein the fourth busbar opening has a first edge on a first side of the second busbar facing away from the insulation, said first opening boundary extending at least to a height of the first edge and/or wherein the second busbar opening has a second edge on a second side of the first busbar facing away from the insulation, said second opening boundary extending at least to a height of the second edge.

16. The converter of claim 15, wherein the first opening boundary extends beyond the first edge and/or wherein the second opening boundary extends beyond the second edge.

17. The converter of claim 13, wherein each of the first and second boundaries of the insulation has a bead.

18. The converter of claim 13, wherein the first insulation opening is sized larger than the first busbar opening, and the second insulation opening is sized larger than the third busbar opening.

19. The converter of claim 13, wherein the insulation has surfaces facing toward the first and second busbars and extending completely beyond the first and second busbars, said insulation being formed as a single piece.

20. The converter of claim 13, wherein the first and second busbars extend at a distance to one another to define an insulation space therebetween for electrical insulation of the first and second busbars, said insulation being configured as a separate insert element and disposed within the insulation space, said apparatus further comprising a further insulation directly connected to the insulation within the insulation space.

21. The converter of claim 20, wherein the further insulation is a single-layered or multi-layered film.

22. The converter of claim 13, wherein the first busbar opening has a funnel-shaped impression and/or wherein the third busbar opening has a funnel-shaped impression.

23. The converter of claim 22, wherein the funnel-shaped impression of the first busbar opening and/or the funnel-shaped impression of the third busbar opening is/are formed in a direction of the insulation.

24. The converter of claim 13, wherein the third busbar opening is arranged in a connection plane with the first busbar opening.

\* \* \* \* \*